(12) United States Patent
Nuesser et al.

(10) Patent No.: US 6,870,487 B2
(45) Date of Patent: Mar. 22, 2005

(54) METHOD FOR TRANSMITTING DATA PACKETS BETWEEN MOTOR VEHICLES

(75) Inventors: Rene Nuesser, Kaarst (DE); Peter Vogel, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 151 days.

(21) Appl. No.: 09/935,178

(22) Filed: Aug. 22, 2001

(65) Prior Publication Data

US 2002/0030611 A1 Mar. 14, 2002

(30) Foreign Application Priority Data

Aug. 22, 2000 (DE) .......................................... 100 41 099

(51) Int. Cl.⁷ ................................................. G08G 1/00
(52) U.S. Cl. ....................... 340/901; 340/902; 340/905; 340/928; 340/995.13; 370/229; 370/389; 455/11.1; 455/466; 701/117
(58) Field of Search ................................. 340/901, 902, 340/903, 905, 907, 904, 928, 995.12, 995.13; 324/244, 207.13; 701/117, 2, 118, 119; 455/11.1, 466; 370/229, 389, 230, 230.1

(56) References Cited

U.S. PATENT DOCUMENTS

| | | | | |
|---|---|---|---|---|
| 6,137,425 A | * | 10/2000 | Oster et al. ................. | 340/994 |
| 6,150,961 A | * | 11/2000 | Alewine et al. ............. | 340/995 |
| 6,151,308 A | * | 11/2000 | Ibanez-Meier et al. ..... | 370/316 |
| 6,236,337 B1 | * | 5/2001 | Beier et al. ................. | 340/905 |
| 6,304,816 B1 | * | 10/2001 | Berstis ....................... | 701/117 |
| 6,381,533 B1 | * | 4/2002 | Crane et al. ................ | 701/200 |
| 6,397,141 B1 | * | 5/2002 | Binnig ........................ | 701/117 |

FOREIGN PATENT DOCUMENTS

| | | |
|---|---|---|
| DE | 197 21 750 | 11/1998 |
| DE | 197 40 602 | 3/1999 |
| DE | 198 22 914 | 11/1999 |
| DE | 199 03 909 | 8/2000 |

* cited by examiner

*Primary Examiner*—Davetta W. Goins
(74) *Attorney, Agent, or Firm*—Kenyon & Kenyon

(57) ABSTRACT

A method for transmitting data packets between motor vehicles includes transmitting individual data packets including vehicle data and generation data for the individual data packets. Other motor vehicles may combine the individual data packets into combined data packets and transmit them. The data packets may include fields, each of which may include data-packet generation data and vehicle data. To allow processing to be performed in the transmitting/receiving stations in motor vehicles. Permanently installed radio stations allow a main station to supply information columns at clearly defined points with traffic information to inform users outside of the roads.

48 Claims, 3 Drawing Sheets

METHOD FOR TRANSMITTING DATA PACKETS BETWEEN MOTOR VEHICLES

FIELD OF THE INVENTION

The present invention relates to a method for transmitting data packets between motor vehicles.

SUMMARY OF THE INVENTION

An exemplary embodiment and/or exemplary method of the present invention is directed to transmitting data packets between motor vehicles without necessitating logging into a network. The data packets may be forwarded from one motor vehicle to other motor vehicles, so that is believed that an efficient exchange of traffic information may occur between vehicles, where the traffic information is highly current. In addition it is believed that using combined data packets may allow efficient transmission, since the traffic information to be transmitted is based on the evaluation of many road users, and the amount of data to be transmitted can be kept small. It is also believed that the transmission over the entire ad hoc network may allow that the information to be distributed quickly, inexpensively, and over a large area.

Another exemplary embodiment and/or exemplary method of the present invention is directed to providing combined data packets and individual data packets from motor vehicles combined into new, combined data packets, so that useful information regarding the traffic situation can be transmitted efficiently. It is believed that this may allow a savings in transmission bandwidth, and the use of the distributed intelligence of the ad hoc network, since not every motor vehicle has to calculate the traffic information new.

Another exemplary embodiment and/or exemplary method of the present invention is directed to providing that a motor vehicle compares a number of received, individual data packets and/or combined data packets with a threshold value, and only combines these individual data packets and/or combined data packets into combined data packets, in response to the threshold value being exceeded, in order to therefore ensure efficient transmission.

Another exemplary method and/or exemplary method of the present invention is directed to transmitting data packets between motor vehicles, in which the data packets are transmitted as individual data packets which have vehicle data and data-packet generation data, and/or as combined data packets which are made up of individual data packets; the data packets are transmitted and received by the motor vehicles; and the motor vehicles combine the received data packets into new, combined data packets.

Another exemplary embodiment and/or exemplary method of the present invention is directed to providing a transmitting/receiving station which itself determines how often a data packet is transmitted. For example, this may occur periodically, in which case the transmission interval can be permanently set or be a function of the data-traffic volume. If many data packets are received from a motor vehicle, then a data packet may be transmitted less frequently than if fewer data packets are received. If, for example, the vehicle is in a traffic jam, then the packet should no longer be forwarded so often, since many neighboring vehicles are doing the same thing, and this would cause overloading. This may ensure a more efficient utilization of the available transmission bandwidth.

Another exemplary embodiment and/or exemplary method of the present invention is directed to providing the transmission of the data-packet generation time and the "reference time" (time at which the traffic information applies). Using this information and the data traffic around the motor vehicle, the transmitting/receiving station may make individual decisions regarding the intermediate storage, the erasure, and the further transmission of data packets. The reference time and the generation time are identical in the case of individual data packets. In the case of combined data packets, the reference time is the average value of the generation times of the packets involved.

Another exemplary embodiment and/or exemplary method of the present invention is directed to providing that, using the generation time of the individual data packets, individual data packets that are too old may be eliminated by threshold value comparison, and therefore, no longer forwarded. This may filter out obsolete information and prevent it from loading the radio links anymore, and may save transmission capacity in an advantageous manner.

Another exemplary embodiment and/or exemplary method of the present invention is directed to providing that the motor vehicles ascertain traffic information from the received data packets, and then only retransmit this ascertained traffic information linked to location information. This may lead to savings in the transmission bandwidth, since the raw data (=data in the individual data packets) require more bandwidth for transmitting, because of their numbers. Even the traffic information for various locations can be combined into a combined data packet, so that, using this combined data packet, a traffic-situation statement covering a larger area can be made.

Another exemplary embodiment and/or exemplary method of the present invention is directed to providing that the data-packet generation data for individual data packets and combined data packets have a message number, a vehicle number, generation-time information, and priority information, and that the vehicle data have a current vehicle speed, an average speed over a time interval, the direction of travel, a road number, and a vehicle location. Each of these data may be necessary for determining the traffic situation, and for processing the received data packets efficiently. In this context, in a combined data packet, vehicle data may be used from as many vehicles as possible in one area, in order to render the assessment of the traffic situation as reliable and comprehensive as possible.

Another exemplary embodiment and/or exemplary method of the present invention is directed to providing that a combined data packet indicates how many other data packets were used to create the combined data packet. This may give a receiver a reliable statement regarding the statistical certainty, with which the traffic situation information may be ascertained. If desired, the information regarding the statistical certainty may be shown on a display in the vehicle, as a probability of being correct.

Another exemplary embodiment and/or exemplary method of the present invention is directed to providing that a combined data packet exhibits a current vehicle speed, an average vehicle speed over the time interval, and an average age of the information contained in the combined data packet. This is the average value of the reference times. Therefore, a statistically safe analysis of the traffic situation may be provided.

Another exemplary embodiment and/or exemplary method of the present invention is directed to providing that the vehicle number is either permanently assigned as an identification number by the manufacturer, or is generated as an identification number by a random-number generator, when necessary. If the number is set on the side the manufacturer, then it may either be set by the automobile manufacturer or by a supplier of components.

The data packets themselves may indicate if they are combined data packets or individual data packets, thereby simplifying the processing in a receiver. In addition, a combined data packet may indicate if another combined data packet was used to generate it.

Another exemplary embodiment and/or exemplary method of the present invention is directed to providing that a transmitting/receiving station in a motor vehicle may decide how often a data packet is transmitted, and how long it is temporarily stored, using the generation time of the data packet, the current data volume, and the traffic situation. If, for example, the traffic jam does not exist any more, then all the related data packets may be erased. Data packets may be temporarily stored for a longer period of time in areas that are not heavily traveled.

Another exemplary embodiment and/or exemplary method of the present invention is directed to providing that "all-clear packets" indicating the improvement of a traffic situation, e.g., a traffic jam that has cleared up, are transmitted explicitly (e.g. as an individual packet). Receiving vehicles may then adapt their stored information and correspondingly update the combined packets to be transmitted.

Another exemplary embodiment and/or exemplary method of the present invention is directed to assigning a priority to data packets, so that packets having a high priority may be preferably forwarded. In this manner, the corresponding information is distributed as quickly and as far as possible. The priority also determines the frequency of transmission, since data packets assigned a high priority are more important than data packets assigned a lower priority, and therefore, it should be ensured that these more important data packets are reliably transmitted. Therefore, they are transmitted more frequently.

Another exemplary embodiment and/or exemplary method of the present invention is directed to providing that the time measurement is restarted at fixed times, and the system time counter for the entire system is then set to zero. In this case, the system may include all motor vehicles, which have an apparatus, arrangement or structure for using the ad hoc network. It is believed that this may achieve synchronization. The system time counter may then be counted up (incremented) continuously by all of the motor vehicles. Each data packet to be sent may transmit a time field, whose value corresponds to the system time counter at the time of generation. This may allow each motor vehicle that receives packets to exactly determine the time (relative to the zero point) at which the packets were generated. Therefore, the receiving motor vehicles may receive exact information about the generation time of the packet, the range of values being able to be kept small by resetting the system time counter regularly. The age of the packet may result from the difference of the current value of the system time counter, and the value of the transmitted time field. A cycle may be formed by periodically setting the zero point. Packets generated in a previous cycle may be detected as such by a receiving transmitting/receiving station in a vehicle, by comparing them to the system counter in order to determine the age of these packets. Data packets that are older than a complete cycle can no longer be detected correctly, and must be deleted in a timely manner.

Another exemplary embodiment and/or exemplary method of the present invention is directed to providing signaling the age of the packets, using a counter. To this end, a time counter may be transmitted in the packets, which is set to zero upon generation of the packet, and is incremented in specific time cycles in response to being retransmitted by other vehicles, so that a new value for the counter is always transmitted in the routed packets. This may eliminate the need for using central, uniform time measurement for the entire system, since the receiver can directly ascertain the age from the counter.

Another exemplary embodiment and/or exemplary method of the present invention is directed to providing that transmitting/receiving stations are also permanently installed on the side of the road, in order to collect traffic information and transmit it to a main station. For its part, the main station may be connected to information columns, which may be erected at rest areas and gas stations. The main station may also be connected to the Internet, in order to quickly render the current traffic information accessible to an interested user circle, in the Internet.

Another exemplary embodiment and/or exemplary method of the present invention is directed to providing that for a device to exist, which has an apparatus, arrangement or structure for implementing the exemplary methods. This also includes the transmitting/receiving stations that are permanently installed on the side of the road, in order to receive this information. The main station may be connected to the transmitting/receiving stations and the information columns, via communication channels, in order to receive and transmit information. In this context, the Internet may be tapped into, in order to render this information accessible to a wide audience.

DETAILED DESCRIPTION

Figure 1:
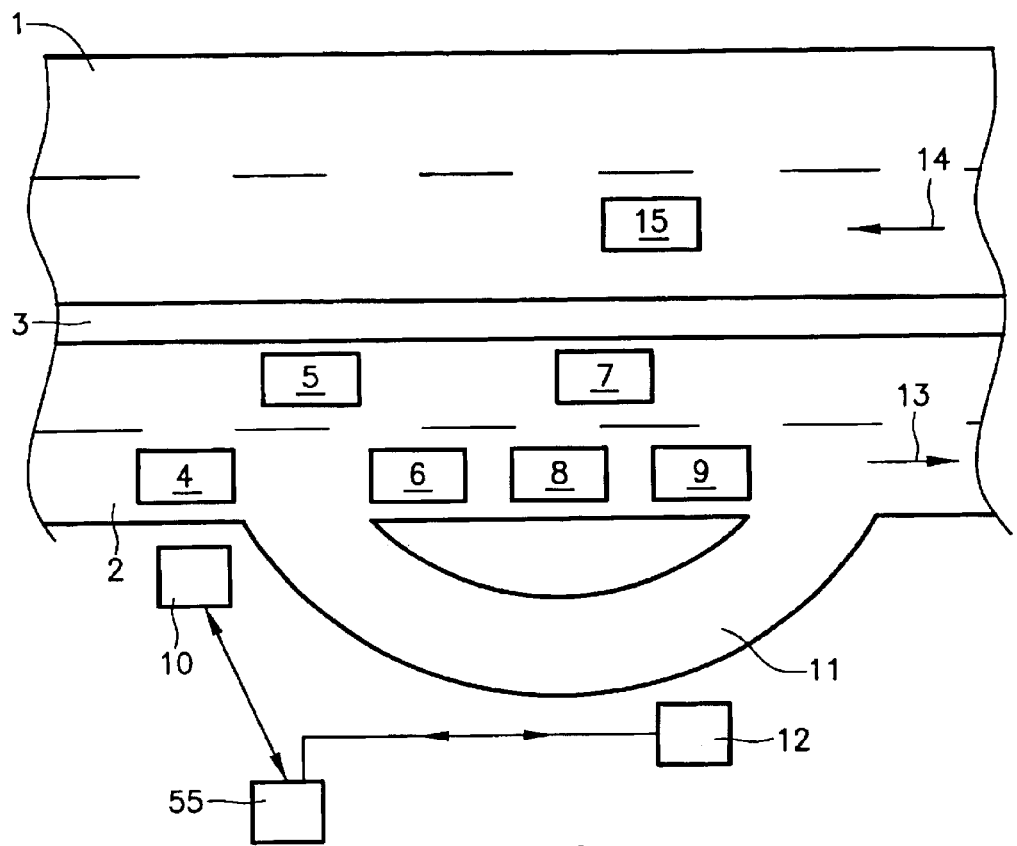
FIG. 1 shows motor vehicles on a road.

It is believed that to quickly distribute current traffic information, which is not subject to a time delay, as may be the case in radio program transmissions, the motor vehicles may be used as the information sources. An exemplary method for transmitting data packets between motor vehicles is used to transmit individual data packets and/or combined data packets having vehicle data and data-packet generation data, to other motor vehicles.

The traffic information generated new by a motor vehicle, by evaluating a corresponding motor-vehicle sensory system, can be transmitted as an individual data packet, or as a combined data packet. An individual data packet only includes information relating to the vehicle generating it, and to the location at the time that the packet is generated. On the other hand, a combined data packet includes information about several different locations and/or different vehicles. Accordingly, newly generated traffic information may also be transmitted as a combined data packet, in combination with traffic information that is already present and stored in the vehicle. The receiving motor vehicles may retransmit individual data packets or transmit the included traffic information as a new combined data packet, in combination with the stored information from previously received, individual and combined data packets.

The received data packets may be evaluated with regard to the data-packet generation data, in order to initiate further processing. In this context, packets that are too old may be sorted out. The use of combined data packets may allow the vehicle data contained in the data packets to be transmitted, and thus, allow a savings or a reduction in the bandwidth, since only one version of the data-packet generation data may be present. Therefore, not every motor vehicle has to carry out the evaluation new, which means that the distributed intelligence of the ad hoc network may be utilized.

Using the combined data packets, the traffic information, which may be necessary for a driver to plan a trip, may be available for a larger range, i.e., for an overall view. The transmission to fixed radio stations on the side of the road may allow this information to be interfaced with a main station, which in turn may supply traffic information to information columns at central points, such as service stations or parking areas. In this context, the main station may render the traffic information centrally available over the Internet.

In the following, the term data packet denotes both individual data packets and combined data packets. Therefore, data packet or packet is to be understood as a generic term. In this case, ad hoc network denotes a communication network used by various motor vehicles, which have a transmitting/receiving station that transmits and receives digital radio signals. Bluetooth signals, which are suitable for short-range radio transmission, and may already be installed for other purposes such as controlling a garage door, can be used as the digital radio signals.

FIG. 1 is a schematic representation of a road situation. An expressway, which is divided by a median strip 3, has two roadways 1 and 2. Each roadway 1 and 2 has two lanes, roadway 2 also having a junction leading to parking lot 11. Motor vehicles 4, 5, 6, 7, 8, and 9 are situated on roadway 2. For purposes of orientation, arrow 13 indicates the direction of travel. A vehicle 15 is situated on roadway 1, and arrow 14 indicates the direction of travel. A radio station 10, which is connected to a main station 55 via a first communication channel, is situated on the side of roadway 2. This first communication channel may be designed to be wire-bound or wireless. Main station 55 may either retrieve the traffic information from radio station 10, or there is a one-sided flow of information from radio station 10 to main station 55 (a simplex channel). Radio station 10 may only act as a receiving station in relation to the ad hoc network, and can only act as a transmitter in communication with main station 55. If radio station 10 also acts as a transmitting/receiving station in relation to the ad hoc network, then radio station 10 may assume the function of a relay station.

Main station 55 may be connected to an information column 12 via a second communication channel. Since the main station may provide traffic information to more than the one information column 12, via the second communication channel, the second communication channel represented here is in the form of a radio channel for digital radio signals. For example, DAB (digital audio broadcasting) can be used for this, because DAB is well suited for transmitting data. However, other digital, radio transmission methods may be used such as DVB (digital video broadcasting) or DRM (Digital Radio Mondiale). As an alternative, the second communication channel can also be designed to be wire-bound. But since the information columns are only supplied with information unilaterally, a simplex communication channel may be sufficient.

Radio station 10 may be permanently installed at its location, and so may information column 12. Information column 12 may include an apparatus, arrangement or structure for optically and/or acoustically representing information. If desired, there may also be an input device that allows the user to selectively retrieve traffic information. In addition, information column 12 may also be used to display other information, such as hotels, events, etc. Consequently, information column 12 may be situated at parking lot 11, in order to offer this service to people who are parking. Main station 55 may make the traffic information centrally available to the public, for example, via the Internet.

In this case, data packets may be transmitted and received by motor vehicles 4, 5, 6, 7, 8, and 9, and by motor vehicle 15 on roadway 1, thereby forming the ad hoc network. Using data-packet generation data and vehicle data, the vehicles may subject the data packets to a first filter. Radio station 10 may also take part in this data traffic, and transmits either the received data packets or previously evaluated data packets, to main unit 55, for traffic information. If the data packets are forwarded to main station 55, then main station 55 may evaluate the data, using appropriate means, in order to generate corresponding traffic information.

Figure 2:
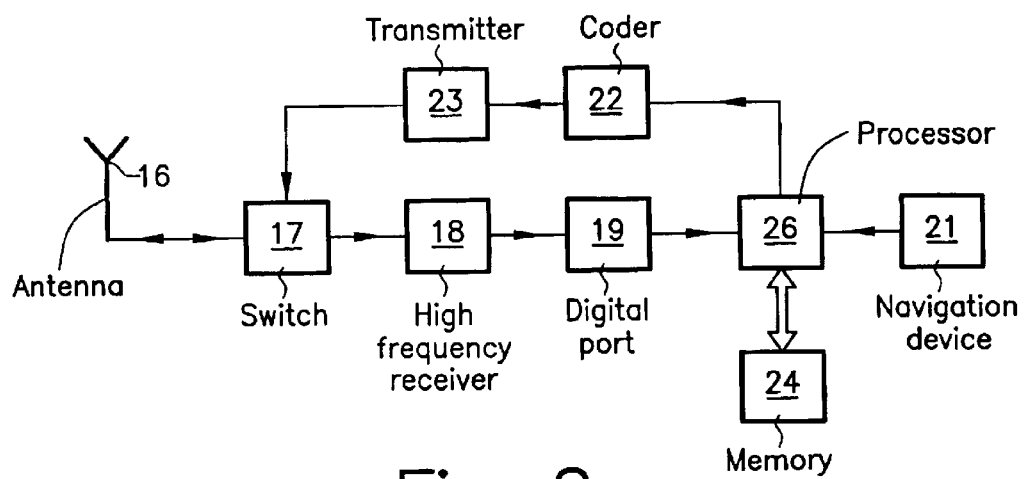
FIG. 2 shows a block diagram of a transmitting/receiving station.

In FIG. 2, the transmitting/receiving station situated in permanent radio station 10 and in motor vehicles 4 through 9 and 15 is represented as a block diagram. An antenna 16 may be connected via an input/output to a switch 17. Switch 17 may connect either the transmitting or receiving part of transmitting/receiving station to antenna 16. An output of switch 17 may lead to a high-frequency receiver 18 which, for its part, may be connected to a digital part 19. The digital output of digital part 19 may lead to a first data input of a processor 20, which is connected via its second data input to a navigation device 21. As an alternative, processor 20 may be connected to another locator device.

Processor 20 may be connected to a memory 24 via a digital data input/output. Memory 24 may be connected to a coder 22 via a digital output. A digital output of coder 22 may lead to a transmitting part 23, which in turn may be connected to an input of switch 17.

The transmitting/receiving device represented in FIG. 2 may normally be in receiving mode, in order to receive data packets. If the transmitting/receiving station wants to transmit data packets, then switch 17 may connect antenna 16 through to transmitting part 23. High-frequency receiver 18 may filter and amplify the received radio signals, and translate their frequencies into an intermediate frequency, the received radio signals then being digitized by digital part 19, and being subjected to channel decoding. Processor 20 then may receives the data stream formed in this manner, from digital part 19, the data stream then being processed by processor 20, using the method according to the present invention. Data packets to be stored temporarily may be stored in a memory 24, and intermediate results may also be saved there for processing.

The location of the motor vehicle and the traveling speed may be transmitted to processor 20 by sensory system 21. In the case of radio station 10, sensory system 21 is only a locator device, which may also be dispensable since the locations of fixed radio stations 10 should be known.

Processor 20 may compute traffic information, using the vehicle data in the data packets. After evaluating the received data packets (individual and/or combined data packets), processor 20 can use these data to calculate the traffic volume in its vicinity, and thus combine them into a new data packet, a combined data packet. In so doing, processor 20 adds data-packet generation data of the motor vehicle, in which processor 20 is situated. Processor 20 may mark these combined data packets, and may also mark other data packets that are retransmitted, with a time stamp, or the processor increments any existing time counters in the data packets for purposes of retransmission, in order to then transmit the time stamp, via coder 22 which performs channel coding, and via transmitting part 23 which may have a digital/analog converter and a send amplifier to antenna 16 in order that the data packets are transmitted. In addition, the information about whether a data packet is a combined data packet or an individual data packet, whether a combined data packet is also made up of other combined data packets, and how long a data packet generated by processor 20 is to be transmitted and temporarily stored is added by processor 20 to the data packets to be sent. Furthermore, the transmitted, combined data packets may include information regarding how many data packets they are made of. Instead of the information about the time interval in which a packet can be transmitted, and how often it may be sent at most, alternatively the data-packet generation time or the time counter can be generated. Consequently, the decisions regarding intermediate storage, erasure, and further transmission can be made, using the transmitting/receiving station.

Figure 3:
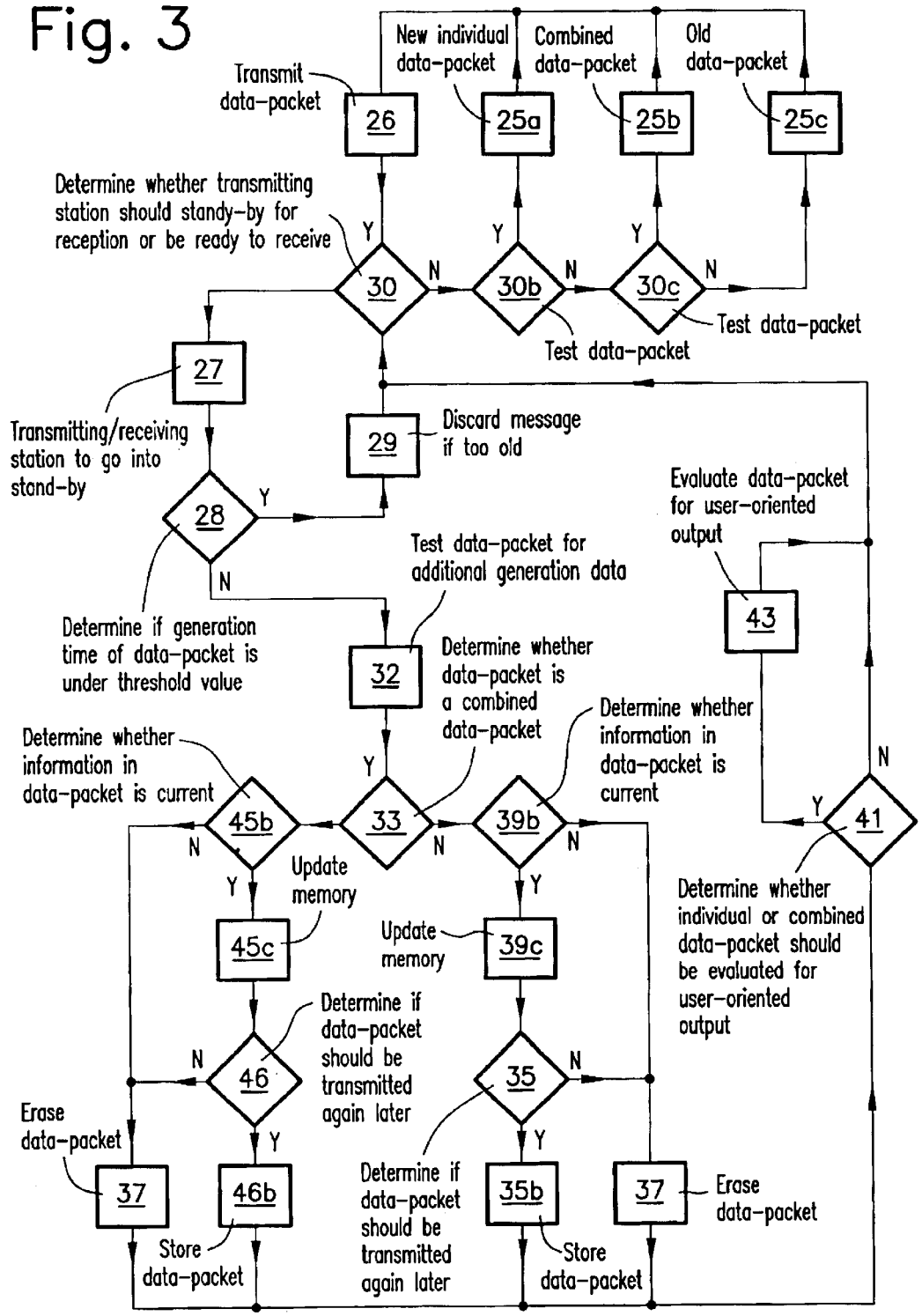
FIG. 3 shows a flowchart of an exemplary method of the present invention.

In FIG. 3, the exemplary method according to the present invention is shown as a flow chart. The upper region of the diagram includes transmitting part (25*a*, 25*b*, 25*c*, 26, 30*b*, 30*c*), and the lower region includes the receiving part.

In method step 30, it is tested whether the transmitting/receiving station should stand by for reception or be ready to receive, and therefore, switch the switch 17 to reception, or whether it wants to transmit a data packet itself. If the transmitting/receiving station should go into receiving standby, it does this in method step 27.

If the transmitting/receiving station transmits a data packet, it is then tested in method step 30*b*, if a new, individual packet 25*a* should be generated. If this is not the case, then it is tested in method step 30*c*, if a new combined data packet 25*b* or an old packet 25*c* contained in the memory should be transmitted. Certain threshold values, e.g., the number of received packets, periodic times, should be exceeded for transmitting a combined data packet.

The necessary vehicle data for generating a new, individual data packet 25*a* or combined data packet 25*b* may be compiled in method steps 25*a*, 25*b*, and may be combined with the data-packet generation data to form a corresponding data packet. Information generated instantaneously by the motor vehicle itself may be utilized for method step 25*a*. Self-generated information and/or information from received packets may be utilized for method step 25*b*. In method step 25*c*, old packets contained in the memory may be selected for retransmission.

The vehicle data may include the current vehicle speed, an average speed over a predefined time interval, the direction of travel, a road number, and a vehicle location. The data-packet generation data may include the message number, a vehicle number, generation-time information, and priority information.

The average speed over a time interval may prevent short-term acceleration or braking from conveying a false impression about the traffic situation. For example, one minute may be used as a preselected time interval.

The road number indicates the type and the identification of the street, i.e., expressway, federal highway, or state highway, and which road. The vehicle location indicates the location at which these data were detected. The vehicle location may be ascertained by the navigation device, which has a GPS receiver and an engine speed sensor.

The message number may be used to identify the data packet, in order to communicate which message it is to the received vehicles, so that the vehicles may, if desired, discard the data packet in response to receiving this message again.

The vehicle number indicates which vehicle generated this message, in order to be able to clearly assign it. If, for example, a vehicle transmits several messages having different message numbers, then it is, however, identifiable, that the data packets were sent by one in the same vehicle, so that this can be utilized for a further assessment of the traffic volume. The vehicle number may either be assigned by the manufacturer, or generated by a random number generator if the vehicle participates in an ad hoc network.

The priority information aids in preferentially relaying an individual data packet or a combined data packet, so that this information may be distributed quickly and wide. It is especially useful to award a high priority in the case of a change in the traffic situation, e.g., for all-clear packets, which indicate that a traffic jam has cleared up. Further fields are possible for additional data-packet generation data.

Figure 4:
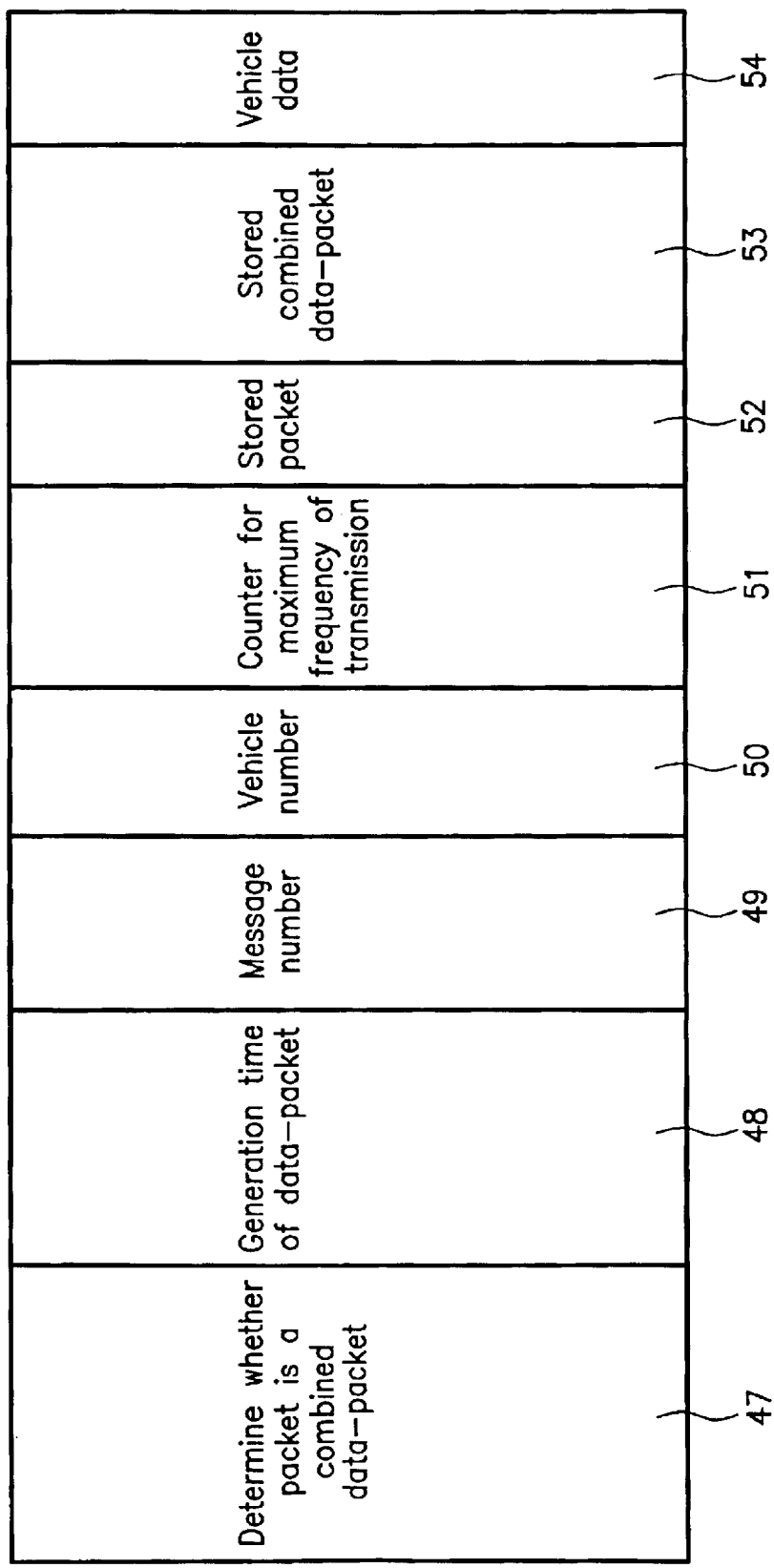
FIG. 4 shows an assignment of data fields in a data packet.

The data packet is transmitted in method step 26. FIG. 4 gives an example of how such data packet can be constructed. In a first field 47, it is indicated whether or not the packet is a combined data packet. If this is not the case, then it is an individual data packet. The generation time of this packet is specified in field 48. As an alternative, it is also conceivable to transmit a time counter in this field 48, which directly indicates the age of the message, and is increased at regular intervals. The message number is specified in field 49, and the vehicle number is specified in field 50. In field 51, a counter for the maximum frequency of transmission is specified, the counter therefore being decremented by one value at each instance of transmission. This may prevent the data packet from leading to a data packet avalanche, and finally causing the ad hoc network to collapse. But in this case, the message cannot be prevented from being simultaneously transmitted by different vehicles, so that several copies of the same messages are distributed over the ad hoc network. This may also be useful for distributing information as quickly as possible.

The priority level, e.g., if this packet should preferably be retransmitted, is inputted into field 52. The maximum storage time that a transmitting/receiving station can temporarily store this data packet, in order to possibly combine it with other data packets to form a combined data packet, is indicated in field 53. As an alternative, one can dispense with field 53, since a transmitting/receiving station can determine this itself from the generation time of the data packet, and from additional data. Vehicle data, such as the current vehicle speed or the average speed over the predefined time interval, are stored in field 54. In this case, the average, current vehicle speed, the average vehicle speed over a predefined time interval, and the average age of the data packets combined to form the combined data packet, are included in a combined data packet. This information is linked to a location, which is specified in this field 54, as well. The information may also include location regions, which contain a plurality of individual, adjacent locations.

In addition, such information may be specified for various locations, information on a specific location then being followed by the corresponding traffic information. In this case, field 54 is divided into various partial fields. Processor 20 then evaluates the traffic information for various locations, in order to then mark the traffic information on a digital map, as a function of location, or to indicate it in the form of text.

The transmitting/receiving station, which is either situated in a vehicle, or is stationary transmitting/receiving station 10, receives a data packet in method step 27. In method step 28, the generation time or the time counter from message field 48 is compared to a threshold value stored in the transmitting/receiving station, in order to determine if the message is not already too old. If desired, the threshold value can be selected individually by the user. In the case of the message being too old, the message is then discarded in method step 29, and in method step 30, it is tested whether the transmitting/receiving station should stand by for reception, i.e. switch the switch 17 to reception, or wants to transmit a data packet itself. If the transmitting/receiving station should go into receiving standby (or a ready-to-receive state), it does this in method step 27, in order to further proceed as described above. If the transmitting/receiving station transmits a data packet itself, then the method proceeds in method step 30b, as described above.

If it was determined in method step 28, that the generation time of the data packet is still under the threshold value, then, in method step 32, the data packet is tested further for its additional data-packet generation data. In a first field 33, it is checked whether or not the data packet is a combined data packet.

The method steps are principally the same for combined and individual data packets, and shall only be represented below for combined data packets (in each instance, the method step for individual packets is specified in parentheses).

It is decided in method step 45b (39b) if the information included in the data packet is still current. This is decided by adjusting the included information to the contents of the memory, and to the generation time, and by adjusting the information contained in the counter, which indicates how often the individual data packet was already transmitted. If at least one of the conditions is satisfied, then the individual data packet is erased. The erasing is done in method step 37. If the content of the data packet is current, then the memory is updated in method step 45c (39c), with the aid of the received data.

In method step 46 (35), it may be subsequently decided if the data packet should be transmitted again later. If this is the case, then the data packet may be stored in method step 46b (35b). Otherwise, the data packet is erased in method step 37.

In method step 41, it is checked whether or not the received, individual or combined data packet should be evaluated for a user-oriented output, possibly in connection with a route that was input beforehand. If this is the case, then this evaluation is performed in method step 43. In this context, a user of the vehicle is informed of this result about the traffic volume, using means for optical and/or acoustic representation, e.g. in a graphical representation, which depicts the volume of traffic on a digital map. Subsequently, it is decided again in method step 30, if there will be transmission or reception.

To synchronize the transmitting/receiving stations in the motor vehicles with each other, all of the transmitting/receiving stations are reset at certain times by a system time counter, in order to set a zero point. The system time counter is then counted up continuously by all of the transmitting/receiving stations. For this purpose, the motor vehicles have a radio receiver, e.g., a radio clock, which presets the clock pulse for the system counter.

Each data packet to be sent transmits a time field, whose value corresponds to the system time counter at the time of generation. The age of a data packet results from the difference of the current value of the system time counter, and the value of the transmitted time field.

If the generation time of a data packet is prior to the zero point, then the transmitting/receiving station may detect the age of the data packet, using the system counter. If the counter for the generation time is greater than the system counter, then the transmitting/receiving station may understand that the generation time must be prior to the zero point, and that it might be useful to add the system counter to the difference of the system-counter maximum value and the generation time, in order to determine the age. In this context, all of the data packets may be generated prior to the zero point are erased, or, in order to avoid losing valuable information, the data packets which were generated within a predefined period of time prior to setting the zero point may continue to be used. A cycle between two zero point settings may be several hours.

To prevent packets generated prior to the zero point, i.e., in the "old cycle", from being falsely interpreted as new packets, old packets should be erased regularly. For example, packets older than half the maximum value of the system counter should be erased. Packets which are older than the maximum value of the system time counter may no longer be recognized.

As an alternative, a time counter may be continuously incremented for determining age. To this end, a counter is transmitted in the packets, which is set to zero upon generation of the packet, and is incremented in specific time cycles in response to being transmitted by other vehicles, so that a new value for the counter is always transmitted in the forwarded packets. This may eliminate the need for using central, uniform time measurement for the entire system, since the receiver can directly ascertain the age from the counter.

It may also be useful to periodically transmit the data packets from a transmitting/receiving station, in order to ensure that the data packet is actually received and sufficiently distributed.

What is claimed is:

1. A method for transmitting a data packet between motor vehicles, comprising:
   transmitting the data packet as at least one of:
   an individual data packet having a vehicle data and a data-packet generation data, and
   a combined data packet comprised of more than one individual data packet;
   receiving the data packet by the motor vehicles;
   combining the data packet into a new combined data packet by the motor vehicles subsequently; and
   signaling by the data packet to indicate that the data packet is one of the individual data packet and the combined data packet.

2. The method of claim 1, further comprising:
   comparing at least one of a number of the data packet and a number of the combined data packet from the motor vehicles to a first threshold value; and
   generating the new combined data packet from the data packet received in response to exceeding the first threshold value.

3. The method of claim 1, further comprising:
   effecting at least one of:
   transmitting the data packet received further, and
   combining the data packet received into a second new data packet and transmitting the second new data packet;

wherein a generation time of the second new data packet is one of exceeded and fallen below a second threshold value.

4. The method of claim 1, further comprising:
ascertaining the vehicle data and the data-packet generation data from the data packet received for generating traffic information; and
transmitting the traffic information in a second combined data packet for transmission.

5. The method of claim 6, further comprising:
combining the traffic information for various locations into a second combined data packet.

6. The method of claim 1, further comprising:
generating and transmitting the data-packet generation data with the data packet, wherein the data-packet generation data includes a message number, a vehicle number, a generation-time information, and a priority information; and
generating and transmitting the vehicle data with the data packet, wherein the vehicle data includes a current vehicle speed, an average speed over a time interval, a travel direction, a road number and a vehicle location.

7. The method of claim 1, wherein in a new combined data packet, a number of the individual data packet and the combined data packet were combined to form the new combined data packet is indicated.

8. The method of claim 7, further comprising:
transmitting the new combined data packet, wherein the new combined data packet includes an average current vehicle speed of the data packet, an average vehicle speed over a time interval of the data packet and an average age of the data packet.

9. The method of claim 7, wherein the vehicle number for a specific vehicle is permanently assigned or generated by a random number generator.

10. The method of claim 11, further comprising:
signaling by the data packet to indicate that the data packet is one of the individual data packet and the combined data packet.

11. A method for transmitting a data packet between motor vehicles, comprising:
transmitting the data packet as at least one of:
an individual data packet having a vehicle data and a data-packet generation data, and
a combined data packet comprised of more than one individual data packet;
receiving the data packet by the motor vehicles; and
combining the data packet into a new combined data packet by the motor vehicles subsequently;
wherein the combined data packet indicates whether the combined data packet originated from at least one additional, combined data packet.

12. The method of claim 1, further comprising:
setting how often the motor vehicle retransmits the data packet.

13. The method of claim 1, further comprising:
restarting a system time measurement at a fixed time;
setting a system time counter to zero,
wherein the system time counter in the data-packet generation time sets when the data packet transmits a generation time.

14. The method of claim 1, further comprising:
transmitting a counter in the data packet; and
incrementing the counter in predetermined time cycles in response to being transmitted by another motor vehicle, wherein the counter is set to zero upon generation of the data packet.

15. The method of claim 1, further comprising:
receiving the data packet by a radio station, wherein the radio station is permanently located.

16. The method of claim 15, further comprising:
forwarding by the radio station the data packet received to a main station, the main station being associated with at least one of an information column and an Internet.

17. The method of claim 1, further comprising:
emitting periodically the data packet by a motor vehicle.

18. The method of claim 1, wherein a frequency of transmission of the data packet is a function of data traffic around the motor vehicle.

19. The method of claim 1, wherein a frequency of transmission of the data packet is a function of a priority information in a data-packet generation data.

20. The method of claim 1, wherein an all-clear packet is transmitted as an individual data packet, the all-clear packet indicating any improvement of a traffic situation.

21. The method of claim 20, wherein the all-clear packet is assigned a high priority.

22. The method of claim 1, further comprising:
ascertaining a statistical reliability of a traffic information item using at least one of:
the data-packet generation data of the data packet received, and
a number of the data packet received; and
indicating the statistical reliability to a user of a receiving motor vehicle.

23. A device for transmitting and processing traffic information in a motor vehicle, comprising:
a processor;
a transmitting/receiving station;
a memory; and
at least one of an acoustic output, an optical output, and an acoustic/optical output;
wherein the device is associated with a locator device and wherein the transmitting/receiving station at least one of transmits and receives a data packet, the memory and the processor being configured to combine the data packet into a new combined data packet, the transmitting/receiving station being assisted by the at least one of an acoustic output, an optical output and an acoustic/optical output, and
wherein at least one the following is satisfied:
the combined data packet indicates whether the combined data packet originated from at least one additional, combined data packet, and
signaling by the data packet occurs to indicate that the data packet is the combined data packet.

24. A transmitting/receiving station for at least one of transmitting and receiving traffic information in a motor vehicle, comprising:
an antenna;
a switch;
a high-frequency receiver;
a digital part;
a processor;
a memory;
a coder; and
a transmitting part,
wherein the antenna, the switch, the high-frequency receiver, the digital part, the processor, the memory, the coder and the transmitting part are used to effect a transmission of at least one data packet between two or more motor vehicles so that the at least one data packet having a vehicle data and a data-packet generation data is transmitted and combined into a new combined data packet by the two or more motor vehicles output, and wherein at least one the following is satisfied:
the combined data packet indicates whether the combined data packet originated from at least one additional, combined data packet, and
signaling by the data packet occurs to indicate that the data packet is the combined data packet.

25. A main station for implementing a method for transmitting a data packet between motor vehicles, comprising:
means for transmitting the data packet as at least one of:
an individual data packet having a vehicle data and a data-packet generation data, and
a combined data packet comprised of more than one individual data packet;
means for receiving the data packet by the motor vehicles; and
means for combining the data packet into a new combined data packet by the motor vehicles subsequently,
wherein a statistical reliability of a traffic information item is ascertained, using the data-packet generation data of the at least one of the data packet received and a number of the data packet received, the statistical reliability being indicated to a user of the motor vehicle receiving the data packet, and
wherein at least one the following is satisfied:
the combined data packet indicates whether the combined data packet originated from at least one additional, combined data packet, and
signaling by the data packet occurs to indicate that the data packet is the combined data packet.

26. An information column for implementing a method for transmitting a data packet between motor vehicles, comprising:
means for transmitting the data packet as at least one of:
an individual data packet having a vehicle data and a data-packet generation data, and
a combined data packet comprised of more than one individual data packet;
means for receiving the data packet by the motor vehicles;
means for combining the data packet into a new combined data packet by the motor vehicles;
receiving the data packet by a radio station, wherein the radio station is permanently located; and
forwarding by the radio station the data packet received to a main station, the main station being associated with at least one of an information column and an Internet;
wherein at least one the following is satisfied:
the combined data packet indicates whether the combined data packet originated from at least one additional, combined data packet, and
signaling by the data packet occurs to indicate that the data packet is the combined data packet.

27. The method of claim 15, further comprising:
transmitting the data packet by the radio station.

28. The device of claim 23, wherein the locator device is a navigation device.

29. The method of claim 11, further comprising:
comparing at least one of a number of the data packet and a number of the combined data packet from the motor vehicles to a first threshold value; and generating the new combined data packet from the data packet received in response to exceeding the first threshold value.

30. The method of claim 11, further comprising:
effecting at least one of:
transmitting the data packet received further, and
combining the data packet received into a second new data packet and transmitting the second new data packet;
wherein a generation time of the second new data packet is one of exceeded and fallen below a second threshold value.

31. The method of claim 11, further comprising:
ascertaining the vehicle data and the data-packet generation data from the data packet received for generating traffic information; and
transmitting the traffic information in a second combined data packet for transmission.

32. The method of claim 31, further comprising:
combining the traffic information for various locations into a second combined data packet.

33. The method of claim 11, further comprising:
generating and transmitting the data-packet generation data with the data packet, wherein the data-packet generation data includes a message number, a vehicle number, a generation-time information, and a priority information; and
generating and transmitting the vehicle data with the data packet, wherein the vehicle data includes a current vehicle speed, an average speed over a time interval, a travel direction, a road number and a vehicle location.

34. The method of claim 11, wherein in a new combined data packet, a number of the individual data packet and the combined data packet were combined to form the new combined data packet is indicated.

35. The method of claim 34, further comprising:
transmitting the new combined data packet, wherein the new combined data packet includes an average current vehicle speed of the data packet, an average vehicle speed over a time interval of the data packet and an average age of the data packet.

36. The method of claim 34, wherein the vehicle number for a specific vehicle is permanently assigned or generated by a random number generator.

37. The method of claim 11, further comprising:
setting how often the motor vehicle retransmits the data packet.

38. The method of claim 11, further comprising:
restarting a system time measurement at a fixed time;
setting a system time counter to zero,
wherein the system time counter in the data-packet generation time sets when the data packet transmits a generation time.

39. The method of claim 11, further comprising:
transmitting a counter in the data packet; and
incrementing the counter in predetermined time cycles in response to being transmitted by another motor vehicle,
wherein the counter is set to zero upon generation of the data packet.

40. The method of claim 11, further comprising:
receiving the data packet by a radio station, wherein the radio station is permanently located.

41. The method of claim 40, further comprising:
transmitting the data packet by the radio station.

42. The method of claim 40, further comprising:
forwarding by the radio station the data packet received to a main station, the main station being associated with at least one of an information column and an Internet.

43. The method of claim 11, further comprising:
emitting periodically the data packet by a motor vehicle.

44. The method of claim 11, wherein a frequency of transmission of the data packet is a function of data traffic around the motor vehicle.

45. The method of claim 11, wherein a frequency of transmission of the data packet is a function of a priority information in a data-packet generation data.

46. The method of claim 11, wherein an all-clear packet is transmitted as an individual data packet, the all-clear packet indicating any improvement of a traffic situation.

47. The method of claim 46, wherein the all-clear packet is assigned a high priority.

48. The method of claim 11, further comprising:
ascertaining a statistical reliability of a traffic information item using at least one of:
the data-packet generation data of the data packet received, and
a number of the data packet received; and
indicating the statistical reliability to a user of a receiving motor vehicle.

* * * * *